United States Patent Office.

CONRAD SEMPER, OF PHILADELPHIA, PENNSYLVANIA, ASSIGNOR TO HARRISON BROTHERS & CO., OF SAME PLACE.

PROCESS OF MAKING A SULPHATE OF ALUMINA COMPOUND.

SPECIFICATION forming part of Letters Patent No. 344,140, dated June 22, 1886.

Application filed March 6, 1886. Serial No. 194,214. (No specimens.)

*To all whom it may concern:*

Be it known that I, CONRAD SEMPER, a citizen of the United States, residing in the city and county of Philadelphia, and State of Pennsylvania, have invented a new and useful Process in the Manufacture of Sulphate of Alumina Compound; and I hereby declare the following to be a full and exact description of the same.

In the manufacture of paper it is usual to employ sulphate of alumina in connection with some other material—such as resin—to size the paper or cause it to be repellent to water. It is also usual in the manufacture of paper to employ a bluing material to destroy the yellow tinge of the paper-stock. In the manufacture of the finer grades of paper ultramarine-blue is used for this purpose. The color of ultramarine-blue is readily destroyed by acid, or by a salt possessing an acid reaction. It has been found that ordinary alum or sulphate of alumina is destructive of the color of ultramarine-blue. I have discovered that this destructive quality of alum or sulphate of alumina may be corrected by treating neutral or slightly basic sulphate of alumina with magnesia carbonate or bicarbonate of magnesia, with the result that these materials will take up part of the sulphuric acid of the sulphate of alumina and form a soluble basic compound consisting, principally, of basic sulphate of alumina, sulphate of magnesia, and water.

My invention may be practiced by treating a solution of sulphate of alumina produced in the usual manner, and preferably hot, (it having been first rendered neutral or slightly basic in any convenient way,) with magnesia carbonate or with bicarbonate of magnesia. I have found from three to five parts of magnesia to one hundred parts of sulphate of alumina to give a satisfactory result. After the sulphate-of-alumina solution has been treated with magnesia carbonate, or bicarbonate of magnesia, it is, either before or after the removal of the insoluble materials therefrom, evaporated to such a degree of concentration as to harden when cool. This concentrated solution is cooled, and the resulting cake is ground and prepared for market in the usual manner.

It is to be understood that should iron be present in the sulphate-of-alumina solution it may be removed therefrom or reduced therein by any usual process.

Letters Patent No. 280,088 have been granted to me for a process of making a neutral porous sulphate of alumina by treating a hot acid solution of sulphate of alumina, of such a degree of concentration as to harden when cold, with carbonate or bicarbonate of magnesia.

Letters Patent of the United States No. 280,089 have been granted to me for a process of making a neutral or basic alumina-magnesian compound by treating a hot acid solution of sulphate of alumina with magnesic carbonate, bicarbonate, or oxide.

I do not now claim either of said processes.

Having thus described my invention, I claim—

The process of making a basic compound, containing basic sulphate of alumina and sulphate of magnesia and water, which process consists in treating a neutral or slightly basic solution of sulphate of alumina with oxide of magnesia, carbonate of magnesia, or bicarbonate of magnesia, as specified.

In testimony whereof I have hereunto signed my name this 4th day of March, A. D. 1886.

CONRAD SEMPER.

In presence of—
WM. CARLSON,
H. V. CLEAVER.